June 28, 1960 L. W. PARKER 2,943,145

TELEVISION TUNING INDICATOR

Filed March 30, 1956

INVENTOR
LOUIS W. PARKER

BY

ATTORNEYS

United States Patent Office 2,943,145

Patented June 28, 1960

2,943,145

TELEVISION TUNING INDICATOR

Louis W. Parker, 28 Polo Road, Great Neck, N.Y.

Filed Mar. 30, 1956, Ser. No. 575,062

21 Claims. (Cl. 178—5.8)

The present invention relates to television systems and is more particularly concerned with circuits adapted to give a positive indication of correct fine tuning in television receivers, thereby to facilitate the tuning of such receivers. The instant application comprises a continuation-in-part of my copending application Serial No. 541,658, filed October 20, 1955, for "Television Tuning Indicator," now abandoned.

In the tuning of a television receiver, there is often a problem in achieving a correct compromise between the sound signals and the picture signals. Due to the fact that in known forms of television transmissions the sound and picture carriers are separated from one another by a fixed frequency difference such as 4.5 megacycles, it is often possible to so tune the receiver that too much sound signal is being applied to the audio portions of the circuit, to the detriment of the picture signals applied to the picture tube, and vice versa. Such incorrect tuning may thus result either in poor picture quality or in the introduction of sound signals into the picture, and in some cases it may in fact cause a buzz in the sound output. In color television receivers this incorrect tuning may result in partial loss of the color burst signal or may produce incorrect and spurious colors or beat frequencies due in part to improper amplification of the color signal side bands.

In the past, fine tuning in such television receivers has comprised a mere trial and error procedure, and such procedures in fact often result in either the sound or picture signal being somewhat detuned whereby the combined reception is somewhat poorer than might otherwise be achieved. The present invention serves to obviate this known difficulty in the tuning of television receivers and provides a positive indication on the face of the cathode ray picture tube itself whereby an observer may immediately achieve correct tuning of both the sound and picture carriers being received.

In accomplishing this improved operation, it has been previously suggested that the amplitude variation of received intelligence signals, e.g. the FM sound carrier, during tuning may be used to achieve a variable bias in a receiver video amplifier stage and this variable bias, by varying the anode potential of the said video amplifier stage, for instance, may be employed to darken the cathode ray picture tube when the tuning is incorrect. Modifications of such systems further contemplate the utilization of variations in other intelligence signals, e.g. the picture carrier, synchronizing pulses, or color carrier in color receivers during tuning for effecting a similar control. The arrangements thus described comprise systems wherein an acceptable picture may be observed on the face of the cathode ray picture tube only when the fine tuning of the receiver is adjusted correctly, and this point of fine tuning in turn corresponds to the point of correct tuning in the case of the sound carrier.

While such prior systems effect the improved tuning described above in a most satisfactory manner, those systems are subject to the disadvantage that they tend to give an indication of "correct" tuning at a preadjusted value of the 4.5 megacycle sound carrier output, for instance, regardless of the signal level at the receiver antenna. In order to maintain this preadjusted value on very weak signals, therefore, the receiver tends to tune into sound and away from the picture carrier. The present invention obviates this difficulty and provides for systems maintaining a substantially correct tuning indication at all useful signal levels being received.

It is accordingly an object of the present invention to provide an improved television tuning indicator.

A further object of the present invention resides in the provision of a circuit giving an indication of correst fine tuning in a television receiver on the picture tube itself of that receiver.

A still further object of the present invention is to provide a television tuning indicator which may be made to disable itself automatically on very weak signals in order to permit the operator to mistune the television receiver to a point where the best signal-to-noise ratio is obtained.

Another object of the present invention resides in the provision of a tuning indicator which is substantially independent of received signal level in the operation thereof.

Still another object of the present invention resides in the provision of improved circuits maintaining a substantially correct indication of proper tuning in a television receiver at all useful signal levels.

A further object of the present invention resides in the provision of a circuit permitting rapid tuning of both the sound and picture carriers in a received television signal.

Still another object of the present invention resides in the provision of a television tuning indicator which is extremely simple in construction and which operates very efficiently.

A still further object of the present invention resides in the provision of an improved television tuning indicator which avoids the necessity of increasing the complexity or adding major components to known television circuits.

The foregoing objects, advantages, construction and operation of the present invention will become more readily apparent from the following description and accompanying drawings, in which.

Figure 1:
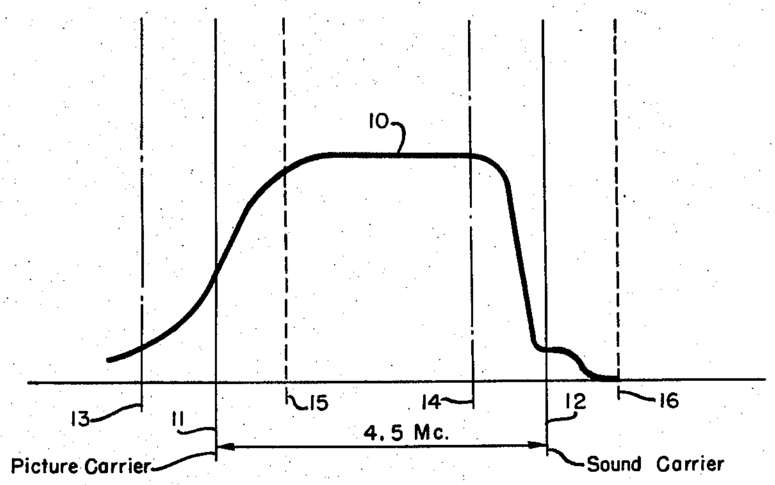
Figure 1 illustrates the selectivity curve of a television receiver.

Referring now to Figure 1, it will be seen that the selectivity curve 10 of a television receiver may take the form illustrated, and in normal operation the picture carrier is tuned to fall on a line 11 while the sound carrier, which is separated from the said picture carrier by a 4.5 megacycle band, is preferably tuned to fall on a line 12. In the case of faulty tuning, the positions of the picture and sound carriers may be changed from lines 11 and 12 either to lines 15 and 16, for instance, or in the alternative, to the position of lines 13 and 14. When the tuning is such that the picture carrier falls on line 13 while the sound carrier falls on line 14, one is said to "tune into the sound," and the sound carrier becomes very large while the picture carrier is extremely small, resulting in disturbing sound signals in the picture. On the other hand, when the tuning is such that the picture carrier falls on line 15 while the sound carrier falls on line 16, one is said to "tune into the picture," in which event the picture carrier becomes very large and the sound carrier almost disappears, resulting in poor picture quality and low or noisy sound. Either of these incorrect tuning situations is of course undesirable, and the known forms of fine tuning heretofore employed have required that an observer achieve a compromise between the two extremes by seeking to so tune the receiver that the picture and sound carriers fall approximately at positions 11 and 12 on the selectivity curve 10 of the receiver. Due to the forms of circuits employed heretofore, however, the picture carrier might be sufficient to provide an adequate picture at any position between positions 13 and 15, for instance, and an observer could well obtain a poor but to some people a suitable picture at a time when the sound is considerably detuned. Similarly, what might be considered good sound to some listeners could be obtained at a time when the picture (or color, in a color receiver) is relatively detuned. This possible variation in the qualities of one factor during a time when the other factor is quite adequate, results in a relatively laborious procedure to achieve proper fine tuning.

In accordance with the present invention, this known difficulty in the tuning of television receivers is eliminated through the provision of a circuit which darkens the picture on the face of the cathode ray picture tube under conditions other than that of correct fine tuning, and when correct fine tuning is achieved with a resultant best picture, the sound carrier itself is correctly tuned. This improved operation is achieved in accordance with a preferred embodiment of the present invention by making use of the amplitude variation effected in the FM sound carrier during fine tuning of the receiver, and this amplitude variation in the sound carrier is employed to derive a control signal which ultimately serves to so vary the brilliance of the picture tube that a direct indication of correct and incorrect tuning may be observed on the picture tube itself.

Figure 2:
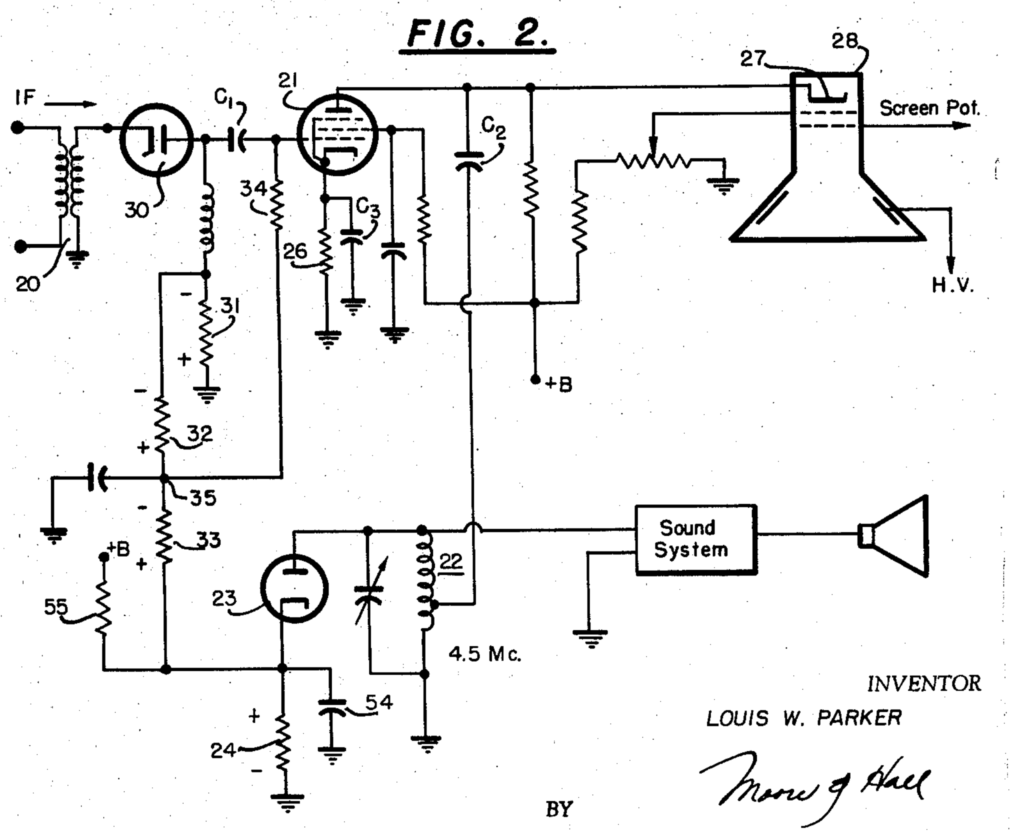
Figure 2 is a schematic diagram of one embodiment of the improved television tuning indicator constructed in accordance with the present invention.

One arrangement operating in the foregoing manner is illustrated in Figure 2. Thus, referring to this figure, it will be seen that in accordance with the present invention a composite IF signal consisting of video, sync. and sound, is coupled via IF transformer 20 to detector diode 30, for instance comprising the second detector of the television receiver, where the IF signal is detected. The detected composite signal may be applied through capacitor C1 to the control grid of a video amplifier tube 21. The signal so applied to the grid of amplifier 21 normally comprises, as mentioned, a composite signal of video components, sound components, and synchronizing signals, and these components are, in ordinary practice, thereafter separated from one another after amplification in the stage 21. It will be appreciated that as the receiver is finely tuned, the relative magnitude of the several components of the aforedescribed composite signal will tend to change in relation to one another and in particular, as the receiver is tuned between positions 14 and 16 (see Figure 1), the magnitude of sound carrier changes considerably. This amplitude variation in the FM sound carrier is utilized in accordance with the present invention to provide a control signal, and such a control signal may be achieved by the arrangement shown in Figure 2.

Thus, the composite signals appearing on the anode of video amplifier 21 may be coupled via a small capacitor C2 to a resonant circuit 22 tuned to 4.5 megacycles. The potential developed across this resonant circuit varies with variations in amplitude of the FM sound carrier, and this variable amplitude potential is applied to the anode of a rectifier 23 whereby a substantially D.C. potential of variable magnitude is developed across the resistor 24 bridged by condenser 54 and coupled to the cathode of the said rectifier 23. This variable amplitude D.C. potential, having a positive polarity with respect to ground, as indicated in Figure 2, is utilized, in combination with other potentials to be described, as a control signal which is ultimately applied via a resistor 34 to the control grid of the video amplifier 21 in the manner illustrated.

In practice, the control grid of video amplifier 21 is normally at a potential which is negative with respect to the cathode of the said amplifier 21, and this reference bias may be achieved, for instance, by the self-bias arrangement comprising resistor 26 and capacitor C3. The anode of video amplifier 21 is directly coupled to the cathode 27 of picture tube 28. The aforementioned reference bias produced by resistor 26 and capacitor C3 is higher than normal when the receiver is so tuned that no appreciable sound signal is received by it and, as a result, a higher than normal positive potential appears at the anode of tube 21 and on the cathode 27 of picture tube 28, rendering the screen of the said picture tube dark.

As the received signal is fine tuned from a position 16 toward a position 14 (see Figure 1), the applied sound signal appearing at the control grid of amplifier 21 tends to increase. This increase in sound carrier produces an increasingly positive potential across resistor 24, and this latter potential in turn acts to vary the potential applied via resistor 34 to the control grid of the amplifier 21. As the bias on the said video amplifier becomes more positive (actually less negative), the anode current of the said video amplifier 21 increases with a resultant lowering of anode voltage. This lowering of the anode potential in tube 21 in turn tends to change the potential on the cathode 27 of picture tube 28 to one nearer ground, due to the direct coupling between the anode of tube 21 and the said cathode 27, and inasmuch as the grid of picture tube 28 is normally at a fixed positive potential below that of the picture tube cathode, the tube will be brighten. Thus, as the receiver is tuned from position 16 to position 12 (see Figure 1), an increasingly brighter picture will be observed on the screen of the picture tube, notwithstanding the fact that the picture carrier is simultaneously being tuned from a position 15 to a position 11.

As one tunes beyond position 12 toward position 14, it will be noted from the selectivity curve 10 in Figure 1 that the amplitude of received sound carrier tends to increase very rapidly. This increased sound carrier amplitude adds to the video signal at the grid of video amplifier tube 21 and causes the grid to be driven positive during the substantially increased peaks of the composite signal. Grid rectification therefore takes place in the amplifier tube 21 and, due to the arrangement of series grid capacitor C1 and grid resistor 34, this grid rectification builds up a negative bias on the control grid of tube 21. It is to be noted that the high negative bias is due not to the high video peaks but to the 4.5 megacycle sound carrier which has practically no amplitude modulation. This increased negative bias is generated notwithstanding the high positive voltage generated across resistor 24, and this is due to the fact that the said negative bias corresponds very nearly to the peak voltage of the A.C. wave applied to the grid of tube 21 when the value of grid resistor 34 is very high, as it is in this case. Due to this grid rectification as the receiver is tuned appreciably beyond position 12 toward position 14, therefore, the average anode current of the video amplifier 21 reduces in magnitude, whereby the anode potential of tube 21 once more increases in magnitude, raising the potential of cathode 27 and again darkening the picture in tube 28.

It will be appreciated that an arrangement of the type thus far described has the disadvantage of tending to show correct tuning at a predetermined and fixed amplitude of 4.5 megacycle sound carrier output, regardless of the signal level present at the receiver antenna; and in order to produce this fixed value of sound carrier during reception of very weak signals, the receiver tends to tune into the sound and away from the picture carrier. The improvement of the present invention serves to obviate this particular difficulty during reception of very weak signals, and in effect renders the tuning indication substantially independent of the signal level being received, provided a usable signal level is in fact being received, whereby an accurate and correct tuning indication is provided at substantially all useful signal levels.

In accomplishing this improved operation, the present invention contemplates varying the bias on amplifier 21 in response to variations in a control signal, which control signal is dependent not only upon variations in the amplitude of a predetermined intelligence signal during tuning, but is also dependent upon the actual signal level present at the second detector of the receiver. Thus, in providing for this improved operation, the output of detector stage 30, which appears across impedance 31, is interconnected with the potential appearing across resistor 24 by an impedance network comprising resistors 32 and 33 connected in series with one another and coupled to ground at a point 35 via a capacitor, as indicated. The aforementioned resistor 34, which is connected to the grid of amplifier 21 at one of its ends, is connected to the said tap point 35 at its other end. Thus, the potential which appears at point 35, and which is applied to the grid of tube 21 via resistor 34, is dependent not only upon the potential across resistor 24 (representative of the aforementioned variations in amplitude of a preselected intelligence signal during tuning), but is also dependent upon the potential appearing across detector load 31 (representative of the actual signal level present at the said detector).

The operation of this improved arrangement will become apparent by consideration of some typical operating potentials which may occur under varying signal levels being received. Thus, when very strong signals are being received, the D.C. component of the potential across detector load 31, at a point of correct tuning, is relatively high, for example twelve volts. At the same time, under such strong signal conditions, the 4.5 megacycle carrier is also high at the point of correct tuning, and after rectification in rectifier 23 the potential across resistor 24 may be in the order of twelve volts. The voltage polarities across impedances 31 and 24 are substantially in series, whereby the total voltage across the series-connected resistors 32 and 33 is approximately twenty-four volts, for the assumed voltages given above.

If we should now assume, for simplicity, that the two resistors 32 and 33 are of equal value, substantially one-half of this total voltage of twenty-four volts appears across each of the said resistors 32 and 33. It should further be noted that the potential across resistor 32 is in polarity opposition to that appearing across impedance 31, and similarly, the potential across resistor 33 is in polarity opposition to that appearing across resistor 24. As a result, the potential at point 35 represents the difference in potential across resistor 32 and impedance 31; or in the alternative, the difference in potential between that across resistor 33 and across resistor 24. As a result, for this first assumed condition corresponding to a strong signal input to the receiver, the junction point 35 will be at about zero volts above ground; and this zero-volt potential is applied via resistor 34 to the grid of amplifier 21 to give the desired correct tuning indication in cathode ray tube 28.

If, now, the signal level at the antenna should drop to a very low value, the potential appearing across detector load 31 will drop in magnitude and the potential across resistor 24 will similarly drop in magnitude. For this latter state of operation wherein weak signals are being received, the potential across detector load 31 may, for instance, be one volt; while the rectified 4.5 megacycle potential appearing across resistor 24 may also be one volt. For this assumed potential relationship, and again assuming that the resistors 32 and 33 are of equal value, the actual potential across either of the resistors 32 or 33 will be one volt, whereby the potential appearing at terminal 35 and coupled via resistor 34 to the grid of amplifier 21, will once more be zero volts above ground. Thus, it will be appreciated that the particular network shown in Figure 2 functions to provide the same bias potential to the grid of amplifier stage 21 at a point of correct tuning in the system, regardless of the actual signal strength present at the receiver antenna.

Summarizing the foregoing operation, it will be seen that the present invention takes advantage of the fact that increases or decreases in signal level at the receiver antenna are accompanied by corresponding increases or decreases in the amplitude of a selected intelligence signal at a point of correct tuning. Through utilization of the particular network illustrated, therefore, the output potential of the detector is effectively subtracted from the first control signal achieved, for instance, by rectification of the 4.5 megacycle sound signal, and a further control signal is then derived which is proportionate to the difference between these potentials. Inasmuch as the two potentials which serve to control the magnitude of the ultimate control signal in the system vary in the same sense with variations in received signal level, the difference between these two potentials tends to remain substantially constant at a point of correct tuning, whereby the ultimate control signal in the system becomes substantially stabilized at the said point of correct tuning.

It will be appreciated that in the foregoing discussion the potentials across resistors 31 and 24 were assumed to be equal, and that resistors 32 and 33 have also been assumed to be of equal value. It should be noted, however, that similar results may be obtained by using unequal potentials, provided the ratio of potentials across resistors 31 and 24 is the same as the ratio of resistance values 32 and 33. It is also possible to alter the point of correct tuning in either direction with variations in signal level at the receiver antenna by varying the ratio of resistances 32 and 33. This particular consideration is extremely valuable in instances where the received signal is very weak and there are noises present; and in such a case a better picture may be obtained by tuning into the picture carrier whereby the over-all receiver is slightly mistuned. By making resistor 32 larger in value than resistor 33, such a result is readily accomplished; and the resistors 32 and 33 may be fixed at desired unequal values or, in the alternative, resistor 33 for instance may be variable in nature. It will be appreciated, of course, that tuning too much towards the picture carrier will result in a decrease in the 4.5 megacycle sound signal (see Figure 1), and therefore only a limited amount of this mistuning is practical.

Thus, the improved operation of the present invention is characterized by an increasingly bright picture being observed on picture tube 28 as the receiver is tuned from position 16 toward position 12, and further fine tuning beyond this position toward position 14 results in a darkening of the picture notwithstanding the fact that under ordinary circumstances the magnitude of picture carrier between positions 11 and 13 might be sufficient to provide an adequate picture. Moreover, by use of the circuit discussed above, the said tuning indication is substantially independent of received signal level. When the receiver is being tuned, therefore, a brightest and best picture is achieved in a relatively limited region around position 11 of the picture carrier for substantially all usable levels of received signal, and this best picture corresponds to the tuning of a sound carrier to a correct region in the vicinity of position 12. A direct indication of correct fine tuning in thus effected in a most efficient and improved manner, and this indication, as discussed above, comprises a maximum background illumination in the picture being observed.

When picking up a very weak signal with noises present, it is sometimes advantageous to greatly mistune the receiver in order to reach the best compromise between picture quality and noise interference. In such cases, there is no purpose to the tuning indicator and the operator has to depend on his judgment to effect that compromise. To accomplish the disabling of the tuning indicator on low signal levels, bleeder resistor 55 may be added to the circuit shown in Figure 2. The upper end of this resistor 55 is connected to the positive side of the plate power supply and its use makes it possible to maintain a steady low D.C. potential across resistor 24. Rectification of the 4.5 megacycle sound carrier by diode 23 can then only take place when the amplitude of that carrier is higher than this D.C. or bias potential across resistor 24. Consequently, at low signal levels, the FM carrier is not rectified and the potential fed to the grid of amplifier 21 remains substantially constant during tuning, eliminating the change in background illumination of the picture. It is to be noted that the operation or disabling of the tuning indicator takes place automatically when moving from a normal field strength to a weak one or back, and the exact field strength where this takes place is adjustable by using a different value of bleeder resistor 55.

While I have thus described a preferred embodiment of the present invention, it will be appreciated that various modifications and variations may be made therein, in respect to both the precise tuning and control circuits, and in respect to their application in various receivers, and it must therefore be stressed that the foregoing description is meant to be illustrative only and should not be considered limitative of my invention. All such modifications as are in accord with the principles described above are meant to fall within the scope of the appended claims.

Having thus described my invention, I claim:

1. In a television receiver having an intermediate frequency circuit, a cathode ray picture tube having a cathode and a control grid, first means coupled to said intermediate frequency circuit for obtaining a first control signal proportional to the signal level received by said receiver, second means coupled to said intermediate frequency circuit and responsive to amplitude variation of a received intelligence signal during tuning of said receiver for obtaining a second control signal, third means coupled to both said first and second means for obtaining a third control signal from said first and second control signals, and control means coupled to said third means and responsive to said third control signal for varying the picture brilliance in said picture tube whereby said picture tube provides a direct indication of correct tuning, said last-named means comprising means for varying the potential between the cathode and control grid of said picture tube.

2. The combination of claim 1 wherein said varying amplitude intelligence signal comprises the received FM sound carrier.

3. The combination of claim 1 wherein said first means for obtaining said first control signal comprises a detector stage coupled to said intermediate frequency circuit in said receiver.

4. The combination of claim 3 wherein said second means for obtaining said second control signal comprises means responsive to amplitude variation of the received FM sound carrier in said receiver, said third control signal being proportional to the amplitude differences of said first and second control signals, said control means including a video frequency amplifier having its anode direct coupled to the cathode of said picture tube.

5. The combination of claim 4 wherein said detector stage has a first impedance at the output thereof for effecting said first control signal, a unilaterally conductive device having a second impedance in series therewith, means applying the sound carrier to said unilaterally conductive device whereby variations in sound carrier amplitude effect corresponding variations in the current flow through said second impedance and unilateral device, thereby to effect said second control signal, an impedance network coupled between said first and second impedances, means deriving a potential from said impedance network in accordance with the ratio of the potentials across said first and second impedances thereby to effect said third control signal, and means coupling said third control signal to the control grid of said video frequency amplifier.

6. The combination of claim 5 including means for biasing said unilateral device whereby said second control signal is effected only when the amplitude of said sound carrier exceeds a predetermined minimum value.

7. The combination of claim 5 wherein said unilaterally conductive device comprises a diode, said sound carrier being applied to the anode of said diode, said second impedance being coupled to the cathode of said diode.

8. In an intercarrier television receiver having an input circuit, a video frequency amplifier, first means coupled to said input circuit for obtaining a first control potential proportional to the picture signal level of a signal being received by said receiver, said input circuit including means responsive to said received signal for producing an intercarrier frequency signal, second means coupled to said input circuit and responsive to amplitude variation of said intercarrier frequency signal during fine tuning of said receiver for obtaining a second control potential, control means coupled to both said first and second means as well as to said amplifier and responsive to the ratio of said first and second control potentials for varying the bias in said video frequency amplifier thereby to vary the anode potential of said amplifier, and tuning means coupled to the output of said video frequency amplifier and responsive to the anode potential of said amplifier for giving a tuning indication during said fine tuning.

9. The combination in claim 8 wherein said control means for varying the bias in said amplifier comprises means deriving a bias control signal proportional to the amplitude difference between said first and second control potentials.

10. The combination of claim 9 wherein said tuning means comprises a cathode ray picture tube in said receiver, the anode of said video frequency amplifier being direct coupled to the cathode of said picture tube to vary the potential of said picture tube cathode whereby said tuning indication comprises a variation in picture brilliance on the face of said picture tube.

11. The combination of claim 10 wherein said first means for obtaining said first control potential comprises a detector in said receiver having a first impedance coupled to the output thereof, said second means responsive to amplitude variation of said intercarrier frequency signal comprising a tuned circuit coupled to the anode of said video frequency amplifier, a rectifier coupled to said tuned circuit whereby the magnitude of current flow in said rectifier is dependent upon the potential developed across said tuned circuit, a second impedance in series with said rectifier for providing a D.C. control potential which varies with variations in current flow in said rectifier thereby to effect said second control potential, said control means comprising a voltage divider between said first and second impedances, and means coupling an intermediate point on said voltage divider to the control grid of said video frequency amplifier.

12. In an intercarrier television receiver, a cathode ray picture tube having a cathode, a grid-controlled video frequency amplifier, means applying a negative reference bias to the control grid of said amplifier, input means responsive to a received signal for producing an intercarrier frequency signal, first means coupled to said input means and responsive to amplitude variations of said intercarrier frequency signal during tuning of said receiver for producing a corresponding positive control potential of variable magnitude, second means coupled to said first means and responsive to the picture signal level of said received signal for modifying the magnitude of said control potential thereby to obtain a resultant control potential, means applying said resultant control potential to the control grid of said amplifier for varying the control grid potential of said amplifier thereby to decrease the anode potential of said amplifier as said receiver is tuned from a detuned state toward a point of correct tuning, said resultant control potential being of sufficient magnitude to drive said amplifier into grid rectification as said receiver is tuned from said point of correct tuning to a point beyond said point of correct tuning thereby to increase the anode potential of said amplifier, and means direct coupling the anode of said amplifier to the cathode of said picture tube.

13. The combination of claim 12 wherein said means producing said positive control potential comprises a rectifier having a resistance in series therewith, means applying said intercarrier frequency signal carrier to said rectifier thereby to vary the current in said resistor whereby the said positive control potential is developed across said resistor, said means for modifying said positive control potential comprising a detector having a potential output proportional to received signal level, and means interconnecting said resistor and said detector output.

14. In a television receiver, a cathode ray picture tube having a cathode, a video frequency amplifier, means applying a video frequency signal including an FM sound carrier to the control grid of said amplifier, a resonant circuit tuned to said sound carrier and coupled to the anode of said amplifier, a rectifier coupled to said resonant circuit, a resistance connected to the cathode of said rectifier, the current in said rectifier varying with amplitude variations of said sound carrier thereby to produce a first potential across said resistance, said receiver including a detector having a second potential output proportional to the picture signal level of the signal being received by said receiver, means interconnecting said resistance and said detector output to derive a variable control signal proportional to the ratio of said first and second potentials, means coupling said control signal to the control grid of said amplifier for varying the control grid potential of said amplifier thereby to vary the anode potential of said amplifier with variations in said control signal, and means coupling the anode of said amplifier to the cathode of said picture tube for varying the potential of said picture tube cathode thereby to vary the brilliance of said picture tube with variations in said control signal.

15. The combination of claim 14 including means applying a negative reference bias to said video frequency amplifier, said varying control signal being positive with respect to ground, whereby a composite varying bias is supplied to the grid of said amplifier which bias is sufficient to drive said amplifier into grid rectification when said receiver is tuned to one side of a correct tuning point.

16. In an intercarrier television receiver having an input circuit including means responsive to a received signal for producing an intercarrier frequency signal having sound components, first means coupled to said input circuit and responsive to tuning variations in the amplitude of said intercarrier frequency signal for deriving a first control signal, second means coupled to said input circuit and responsive to the picture signal level of said received signal for producing a second control signal, third means coupled to both said first and second means and responsive to the magnitudes of said first and second control signals for producing a resultant control potential proportional to the ratio of said first and second control signals, and control means coupled to said third means and responsive to said resultant control signal for giving a tuning indication during tuning of said receiver.

17. The combination of claim 16 wherein said receiver includes a cathode ray picture tube for giving said tuning indication, said control means including means responsive to said resultant control signal for varying the brilliance of said cathode ray picture tube, said resultant control signal being operative to effect substantially maximum brilliance of said picture tube when a point of correct tuning is achieved in said receiver, said means for producing said resultant control signal comprising means interconnecting said first and second control signals in a subtractive sense, whereby said resultant control signal has substantially the same value at said point of correct tuning regardless of the signal level being received by said receiver.

18. In an intercarrier television receiver having a picture tube, input means responsive to a received signal for producing an intercarrier frequency signal, first means coupled to said input means and responsive to amplitude variations of said intercarrier frequency during tuning of said receiver for producing a first control signal, second means coupled to said input means and responsive to the picture signal level of said received signal for producing a second control signal, impedance means coupled to said first and second means for producing a resultant control signal proportional to the ratio of said first and second control signals, and means coupled to said impedance means and responsive to said resultant control signal for giving an indication of correct tuning on said picture tube.

19. In an intercarrier television receiver having a picture tube, a second detector, a video amplifier coupled to the output of said second detector, means coupled to said video amplifier for deriving an intercarrier frequency signal from the output of said video amplifier the amplitude of which intercarrier frequency signal varies during tuning of said receiver, means responsive to variations in the amplitude of said intercarrier frequency signal for producing a first control signal, means coupled to the output of said second detector for producing a second control signal the amplitude of which is proportional to the picture signal level of a signal being received by said receiver, means responsive to both said first and second control signals for producing a third control signal proportional to the ratio of said picture signal level and of said intercarrier frequency signal amplitude during tuning of said receiver, and means coupled to said last-named means and responsive to said third control signal for giving an indication of correct tuning on said picture tube.

20. In a television receiver, first means responsive to a received composite signal having picture and sound carrier components for producing a first control signal proportional to the picture carrier level of said received signal, second means responsive to said received composite signal for producing a second control signal proportional to the sound carrier level of said received signal, third means coupled to both said first and second means for producing a third control signal proportional to the ratio of said first and second control signals, and means responsive to the magnitude of said third control signal for giving an indication of correct tuning.

21. In an intercarrier television receiver, a second detector, means responsive to a received signal for producing, at the output of said second detector, an intercarrier frequency signal containing sound components as well as a first substantially direct current signal the magnitude of which is proportional to the received picture signal level, a video amplifier coupled to said second detector for amplifying said intercarrier frequency signal, means coupled to said amplifier and responsive to said amplified intercarrier frequency signal for producing a second substantially direct current signal the magnitude of which is proportional to the amplitude of said amplified intercarrier frequency signal, means responsive to both said first and second substantially direct current signals for producing a control signal the magnitude of which is proportional to the ratio of said first and second substantially direct current signals, a picture tube in said receiver, and means responsive to said control signal for giving an indication of correct tuning on said picture tube during tuning of said receiver.

References Cited in the file of this patent

UNITED STATES PATENTS

| | | |
|---|---|---|
| 1,951,036 | Parker | Mar. 13, 1934 |
| 2,180,944 | Linsell | Nov. 21, 1939 |
| 2,194,516 | Anderson | Mar. 26, 1940 |
| 2,285,857 | Hewel | June 9, 1942 |
| 2,773,119 | Parker | Dec. 4, 1956 |

OTHER REFERENCES

Rider's T.V. Manual, vol. 8, page Admiral 8–14.